(12) United States Patent
Fukunaga et al.

(10) Patent No.: US 11,936,276 B2
(45) Date of Patent: Mar. 19, 2024

(54) MOTOR-PUMP WITH WIRE HARNESS ARRANGEMENT FOR POWER SUPPLIES

(71) Applicant: Nidec Corporation, Kyoto (JP)

(72) Inventors: Keisuke Fukunaga, Kyoto (JP); Yohei Miyata, Kyoto (JP); Hironobu Kumagai, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 346 days.

(21) Appl. No.: 17/601,756

(22) PCT Filed: Apr. 14, 2020

(86) PCT No.: PCT/JP2020/016366
§ 371 (c)(1),
(2) Date: Oct. 6, 2021

(87) PCT Pub. No.: WO2020/213585
PCT Pub. Date: Oct. 22, 2020

(65) Prior Publication Data
US 2022/0200398 A1     Jun. 23, 2022

(30) Foreign Application Priority Data

Apr. 19, 2019  (JP) ................................. 2019-080350
Apr. 19, 2019  (JP) ................................. 2019-080352

(51) Int. Cl.
*H02K 11/30*     (2016.01)
*H02K 5/22*      (2006.01)
(Continued)

(52) U.S. Cl.
CPC ............... *H02K 5/225* (2013.01); *H02K 9/19* (2013.01); *H02K 9/193* (2013.01); *H02K 11/225* (2016.01);
(Continued)

(58) Field of Classification Search
CPC ............ H02K 9/00; H02K 9/19; H02K 9/193; H02K 11/00; H02K 11/30; H02K 11/25;
(Continued)

(56) References Cited

U.S. PATENT DOCUMENTS

| 4,511,312 A | * | 4/1985 | Hartwig | ................ | F04D 29/669 |
| | | | | | 417/45 |
| 10,259,310 B2 | | 4/2019 | Agata et al. | | |
| 2018/0135633 A1 | * | 5/2018 | Mayleben | ............. | F04D 13/086 |

FOREIGN PATENT DOCUMENTS

| JP | 2005-151712 A | 6/2005 |
| JP | 2006-187105 A | 7/2006 |

(Continued)

*Primary Examiner* — Tran N Nguyen
(74) *Attorney, Agent, or Firm* — Keating & Bennett, LLP

(57) ABSTRACT

A motor assembly includes a motor, an electric pump to supply oil to the motor, an inverter assembly connected to the motor, and a first wire harness and a second wire harness. The inverter assembly includes an inverter to convert a high-voltage direct current into an alternating current and supply the alternating current to the motor, and a controller to control the inverter and the electric pump. The first wire harness electrically connects an external power supply and the inverter assembly, and passes a low-voltage power supply line. The low-voltage power supply line is, at a branch point, branched into a controller power supply line to supply drive power to the controller and a pump power supply line to supply drive power to the electric pump.

9 Claims, 4 Drawing Sheets

(51) Int. Cl.
- *H02K 9/19* (2006.01)
- *H02K 9/193* (2006.01)
- *H02K 11/225* (2016.01)
- *H02K 11/25* (2016.01)
- *H02K 11/33* (2016.01)
- *H02K 24/00* (2006.01)

(52) U.S. Cl.
CPC ............ *H02K 11/25* (2016.01); *H02K 11/33* (2016.01); *H02K 24/00* (2013.01)

(58) Field of Classification Search
CPC ...... H02K 11/33; H02K 11/22; H02K 11/225; H02K 24/00; H01R 13/00; H01R 13/52
See application file for complete search history.

(56) References Cited

FOREIGN PATENT DOCUMENTS

| | | |
|---|---|---|
| JP | 2014-047908 A | 3/2014 |
| JP | 2016-059131 A | 4/2016 |

\* cited by examiner

MOTOR-PUMP WITH WIRE HARNESS ARRANGEMENT FOR POWER SUPPLIES

CROSS-REFERENCE TO RELATED APPLICATIONS

This is a U.S. national stage of application No. PCT/JP2020/016366, filed on Apr. 14, 2020, and with priority under 35 U.S.C. § 119(a) and 35 U.S.C. § 365(b) being claimed from Japanese Patent Application No. 2019-080352, filed on Apr. 19, 2019 and Japanese Patent Application No. 2019-080350, filed on Apr. 19, 2019, the entire disclosures of which are hereby incorporated herein by reference.

1. Field of the Invention

The present disclosure relates to a motor assembly.

2. Background

A motor assembly that drives an axle of a vehicle of a hybrid car and an electric car is known. A conventional motor assembly includes an electric pump that circulates oil in the assembly.

A power supply line extending from the power supply device and a signal line extending from the control device are connected to the electric pump. For this reason, two wire harnesses which pass the power supply line and the signal line are connected to the conventional electric pump. Furthermore, the conventional electric pump requires two connectors for electrically connecting the respective wire harnesses, and thus the number of parts is increased and the assembly process is complicated.

SUMMARY

An example embodiment of a motor assembly of the present disclosure includes a motor, an electric pump to supply oil to the motor, an inverter assembly connected to the motor, and a first wire harness and a second wire harness. The inverter assembly includes an inverter to convert a high-voltage direct current into an alternating current and supply the alternating current to the motor, and a controller to control the inverter and the electric pump. The first wire harness electrically connects an external power supply and the inverter assembly, and includes a low-voltage power supply line. The low-voltage power supply line includes a branch point at which the low-voltage power supply line is branched into a controller power supply line to supply drive power to the controller and a pump power supply line to supply drive power to the electric pump. The second wire harness electrically connects the electric pump and the inverter assembly, and includes the pump power supply line and a pump signal line to transmit a signal between the controller and the electric pump.

The above and other elements, features, steps, characteristics and advantages of the present disclosure will become more apparent from the following detailed description of the example embodiments with reference to the attached drawings.

DETAILED DESCRIPTION

Hereinafter, a motor assembly 10 according to an example embodiment of the present disclosure will be described with reference to the drawings. Note that the scope of the present disclosure is not limited to the example embodiments described below, but includes any modification thereof within the scope of the technical ideas of the present disclosure. Also note that scales, numbers, and so on of members or portions illustrated in the following drawings may differ from those of actual members or portions, for the sake of easier understanding of the members or portions.

Figure 1:
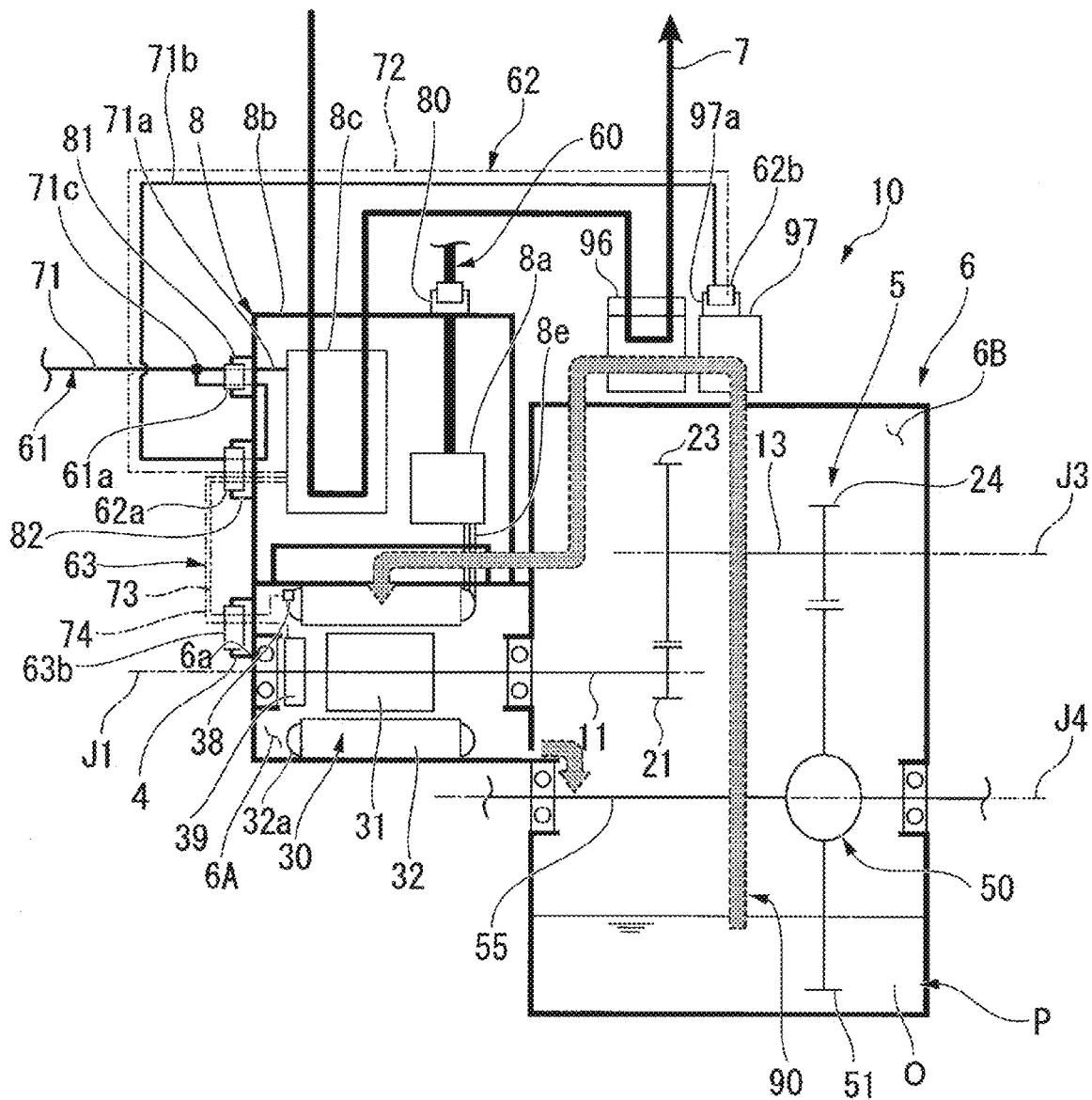
FIG. 1 is a conceptual view of a motor assembly according to an example embodiment of the present disclosure.

FIG. 1 is a conceptual view of the motor assembly 10 according to an example embodiment. Note that a motor axis J1, a counter axis J3, and an output axis J4, which will be described later, are virtual axes that do not actually exist.

The motor assembly 10 is mounted on a vehicle and drives the vehicle by rotating wheels. The motor assembly 10 is mounted on, for example, an electric car (EV). The motor assembly 10 only has to be mounted on a vehicle including a motor as a power source, such as a hybrid electric car (HEV) or a plug-in hybrid electric car (PHV).

As illustrated in FIG. 1, the motor assembly 10 includes a motor 30, a transmission mechanism (transaxle) 5, a housing 6, an electric pump 97, an oil cooler 96, oil O, an inverter assembly 8, a first wire harness 61, and a second wire harness 62.

In the present specification, the wire harness means a bundle of device wiring. One wire harness includes bundled wires, a connector, and the like. The wire harness constitutes part of the signal line or the power supply line. Here, the signal line means a wiring path for transmitting a signal, and the power supply line means a wiring path for driving a drive target. The wire harness is not limited to a wire, and may have rigidity such as a bus bar. In addition, superimposition control may be performed to form one wire.

The motor 30 is an electric generator having both a function as an electric motor and a function as a generator. The motor 30 mainly functions as an electric motor to drive the vehicle, and functions as a generator during regeneration.

The motor 30 includes a rotor 31 and a stator 32 surrounding the rotor 31. The rotor 31 is rotatable about the motor axis J1. The rotor 31 is fixed to a motor drive shaft 11 described later. The rotor 31 rotates around the motor axis J1.

The inverter assembly 8 includes an inverter 8a and a controller 8c. The inverter 8a includes, for example, a capacitor (not illustrated) and an insulated gate bipolar transistor (IGBT). The motor 30 is electrically connected to the inverter 8a. The inverter 8a converts a direct current supplied from a battery (not illustrated) into an alternating current and supplies the alternating current to the motor 30. The torque generated by the motor 30 and each rotation speed are controlled by the inverter 8a.

A temperature sensor (sensor) 38 and a rotation sensor (sensor) 39 are attached to the motor 30. That is, the motor assembly 10 includes the temperature sensor 38 and the rotation sensor 39 as sensors for measuring the state of the motor 30.

The temperature sensor 38 measures the temperature of the motor 30. The temperature sensor 38 is attached to a coil 32a of the stator 32. Therefore, the temperature sensor 38 outputs the temperature of the coil 32a as the temperature of the motor 30.

Figure 2:
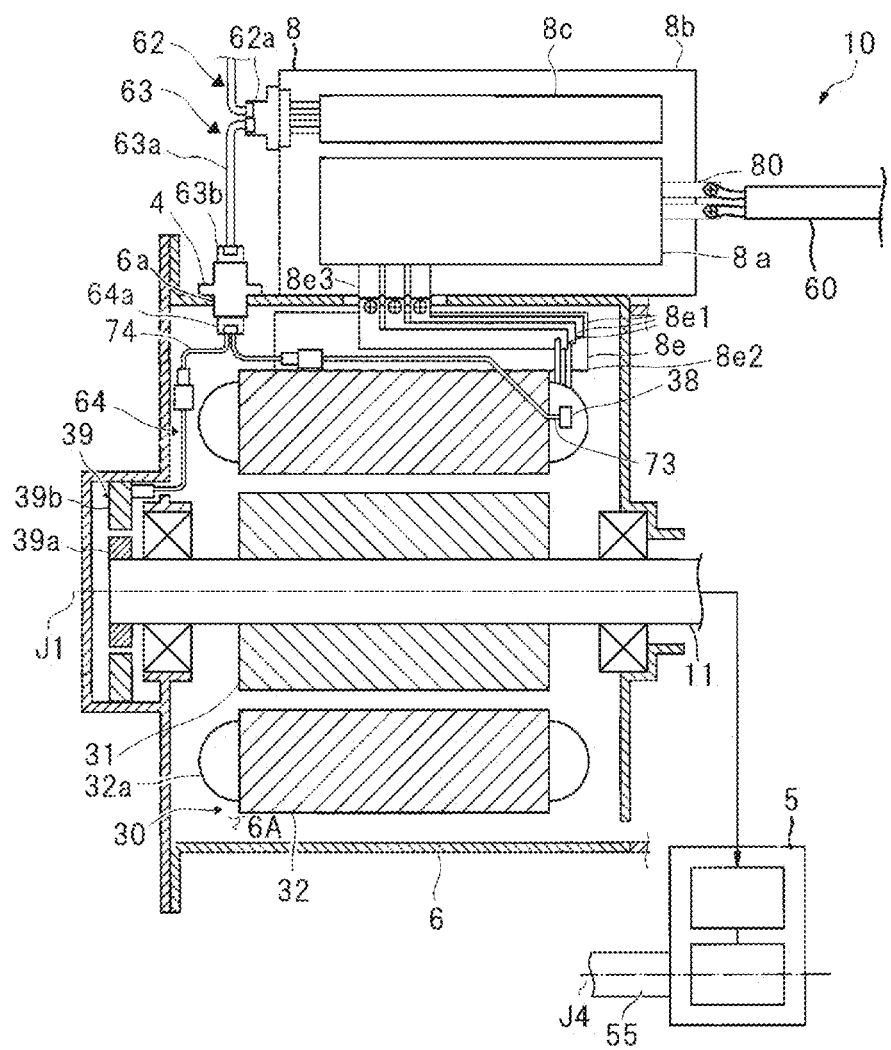
FIG. 2 is an enlarged conceptual view of a motor portion of a motor assembly according to an example embodiment of the present disclosure.

The rotation sensor 39 measures a rotation angle of the motor 30. More specifically, the rotation sensor 39 detects a relative rotation angle of the rotor 31 with respect to the stator 32. As illustrated in FIG. 2, the rotation sensor 39 of the present example embodiment is a resolver including a resolver rotor 39a fixed to the rotor 31 and a resolver stator 39b fixed to the inner wall face of the housing 6.

The housing 6 is provided with a motor connector portion 4. The motor connector portion 4 penetrates the inside and outside of the housing 6 through a connector insertion hole 6a of the housing 6. As illustrated in FIG. 2, the motor connector portion 4 is electrically connected to the temperature sensor 38 and the rotation sensor 39 by a fourth wire harness 64 inside the housing 6. The motor connector portion 4 is connected to a third connector terminal 63b provided at the end of the third wire harness 63 outside the housing 6.

In the present specification, the connector terminal is a collective terminal to be inserted into the connector portion. The connector terminal is provided at an end of the wire harness. The connector terminal includes a plurality of metal pins corresponding to the respective wires of the wire harness. The plurality of pins of the connector terminal are connected to respective metal pins provided in the connector portion.

A transmission mechanism 5 transmits power of the motor 30 to output the power from an output shaft 55. The transmission mechanism 5 incorporates a plurality of mechanisms responsible for power transmission between the drive source and the driven device.

The transmission mechanism 5 includes the motor drive shaft 11, a motor drive gear 21, a counter shaft 13, a counter gear (large gear portion) 23, a drive gear (small gear portion) 24, a ring gear 51, an output shaft (axle) 55, and a differential device (differential gear) 50.

The motor drive shaft 11 extends along the motor axis J1. The motor drive shaft 11 is rotated by the motor 30. The motor drive gear 21 is fixed to the motor drive shaft 11. The motor drive gear 21 meshes with the counter gear 23.

The counter gear 23 extends along the counter axis J3 and is fixed to the counter shaft 13. The drive gear 24 in addition to the counter gear 23 is fixed to the counter shaft 13. The drive gear 24 meshes with the ring gear 51.

The ring gear 51 is fixed to the differential device 50. The ring gear 51 rotates around the output axis J4. The ring gear 51 transmits the power of the motor 30 transmitted via the drive gear 24 to the differential device 50.

The differential device 50 is a device disposed to transfer the torque output from the motor 30 to wheels of the vehicle. The differential device 50 is connected to the pair of output shafts 55. A wheel is attached to each of the pair of output shafts 55. The differential device 50 has a function of transferring the torque to the pair of output shaft 55 while absorbing a difference in speed between the left and right wheels when the vehicle is turning.

The housing 6 accommodates the motor 30 and the transmission mechanism 5. The inside of the housing 6 is partitioned into a motor chamber 6A that accommodates the motor 30 and a gear chamber 6B that accommodates the transmission mechanism 5.

The oil O accumulates inside the housing 6. The oil O circulates through an oil path 90 provided in the housing 6. The oil O is used for lubricating the transmission mechanism 5, and is used for cooling the motor 30. The oil O accumulates in a lower region of the gear chamber 6B (that is, an oil reservoir P). A part of the transmission mechanism 5 is immersed in the oil O of the oil reservoir P. The oil O accumulated in the oil reservoir P is lifted by the operation of the transmission mechanism 5 and diffused into the gear chamber 6B. The oil O diffused into the gear chamber 6B is supplied to each gear of the transmission mechanism 5 in the gear chamber 6B to spread the oil O to the tooth face of the gear and the bearing.

The oil path 90 is provided in the housing 6. The oil path 90 is formed across the motor chamber 6A and the gear chamber 6B. The electric pump 97 and the oil cooler 96 are provided in the oil path 90. In the oil path 90, the oil O circulates through the oil reservoir P, the electric pump 97, the oil cooler 96, and the motor 30 in this order, and returns to the oil reservoir P.

The electric pump 97 is provided in the passage of the oil path 90 and pressure-feeds the oil O. The electric pump 97 is an electric pump driven by electricity. The electric pump 97 sucks up the oil O from the oil reservoir P. The electric pump 97 supplies the oil O sucked up through the oil cooler 96 to the motor 30. The electric pump 97 includes a pump connector portion 97a. A second connector terminal 62b provided at the end of the second wire harness 62 is connected to the pump connector portion 97a.

The oil cooler 96 is provided in the passage of the oil path 90 and cools the oil O passing through the oil path 90. That is, the oil cooler 96 cools the oil O supplied to the motor 30. The oil cooler 96 is fixed to the housing 6.

The oil O that has passed through the oil cooler 96 is supplied to the motor 30 on the upper side of the motor chamber 6A via a flow path provided in the housing 6. The oil O supplied to the motor 30 flows along the outer peripheral face of the motor 30 and the coil surface of the stator 32 from the upper side to the lower side to take heat of the motor 30. As a result, the entire motor 30 can be cooled. Having cooled the motor 30, the oil O drips downward, and is gathered in the lower region in the motor chamber 6A. The oil O accumulated in the lower region in the motor chamber 6A moves to the gear chamber 6B through an opening (not illustrated).

A circulation flow path 7 through which the refrigerant flows is connected to the oil cooler 96. The oil O passing through the inside of the oil cooler 96 is cooled by heat exchange with the refrigerant passing through the circulation flow path 7.

The inverter assembly 8 includes the inverter 8a, the controller 8c that controls the inverter 8a and the electric pump 97, an inverter case 8b that accommodates the inverter 8a and the controller 8c, a high-voltage connector portion 80, a first connector portion 81, and a second connector portion 82. The inverter assembly 8 is fixed to the outer face of the housing 6 in the inverter case 8b. The circulation flow path 7 is connected to the inverter case 8b. That is, the circulation flow path 7 is connected to the inverter assembly 8.

The refrigerant circulates in the circulation flow path 7. The circulation flow path 7 is an annular flow path having no branch. The oil cooler 96, the inverter assembly 8, a radiator (not illustrated), and a refrigerant pump (not illustrated) are disposed in series in the path of the circulation flow path 7. The oil cooler 96 and the inverter assembly 8 are cooled by the refrigerant. The radiator cools the refrigerant. The refrigerant pump pressure-feeds the refrigerant in the circulation flow path 7.

The high-voltage connector portion 80, the first connector portion 81, and the second connector portion 82 are fixed to the inverter case 8b. The high-voltage connector portion 80, the first connector portion 81, and the second connector portion 82 pass through the inside and outside of the inverter case 8b.

The high-voltage connector portion 80 is connected to the inverter 8a inside the inverter assembly 8. A high-voltage wire harness 60 extending from a battery (external battery) of a vehicle (not illustrated) is connected to the high-voltage connector portion 80. The inverter 8a is connected to the battery (external battery) of the vehicle via the high-voltage connector portion 80 and the high-voltage wire harness 60. That is, the electric power stored in the battery of the vehicle is supplied to the inverter 8a via the high-voltage wire harness 60 and the high-voltage connector portion 80. The voltage of the electric power supplied from the high-voltage wire harness 60 is about 300 V to 800 V.

The first connector portion 81 is connected to the controller 8c inside the inverter assembly 8. The first connector portion 81 is connected to the first wire harness 61 outside the inverter assembly 8.

The second connector portion 82 is connected to the controller 8c inside the inverter assembly 8. The second connector portion 82 is connected to the ends of the second wire harness 62 and the third wire harness 63 outside the inverter assembly 8.

The inverter 8a converts a high-voltage direct current supplied from the high-voltage wire harness 60 into an alternating current. The inverter 8a is connected to the motor 30 via a bus bar unit 8e. The inverter 8a supplies the alternating current converted through the bus bar unit 8e to the motor 30.

Next, the bus bar unit 8e will be described with reference to FIG. 2. FIG. 2 is an enlarged conceptual view of portions of the motor 30 and the inverter assembly 8 in the motor assembly 10 of FIG. 1. Note that illustration of some components is omitted. The bus bar unit 8e electrically connects the stator 32 and the inverter 8a. The bus bar unit 8e includes three bus bars 8e1 and a bus bar holder 8e2 that holds the bus bars 8e1. The bus bar 8e1 is made of a conductor. The three bus bars 8e1 are connected to, for example, the U-phase, V-phase, and W-phase coils 32a of the stator 32. In addition, the three bus bars 8e1 is connected to respective three terminals 8e3 extending from the inverter assembly 8. The bus bar 8e1 supplies an alternating current output from the inverter 8a of the inverter assembly 8 to the stator 32.

In the present example embodiment, the bus bar 8e1 is fixed to the bus bar holder 8e2. The bus bar holder 8e2 is made of an insulating material. In the present example embodiment, the bus bar holder 8e2 is made of a resin material. The bus bar holder 8e2 is fixed to at least one of the housing 6 and the stator 32.

A connector of a temperature sensor signal line 73 to be described later may be fixed to the bus bar holder 8e2. Further, a connector of a rotation sensor signal line 74 may be fixed to the bus bar holder 8e2. The connector fixing mechanism of the bus bar holder 8e2 is preferably located near the motor connector portion 4. By providing the connector fixing mechanism, the movement of the cable inside the housing 6 can be suppressed. As a result, it is possible to prevent the cable from coming into contact with the movable component such as the rotor 31 and the high-voltage component such as the bus bar 8e1. In addition, noise generation due to collision between the connector and other components can also be suppressed.

Next, the first wire harness 61 illustrated in FIG. 1 will be described. The first wire harness 61 electrically connects an external power supply (not illustrated) and the inverter assembly 8. The external power supply is a low-voltage (for example, 12 V) power supply. The end of the first wire harness 61 is bundled by a connector terminal 61a. The first wire harness 61 is connected to the first connector portion 81 of the inverter assembly 8 at the connector terminal 61a.

The first wire harness 61 includes a low-voltage power supply line 71. The low-voltage power supply line 71 is a line that transmits low-voltage power from an external power supply to the controller 8c and the electric pump 97. The low-voltage power supply line 71 is branched into a controller power supply line 71a and a pump power supply line 71b at a branch point 71c.

The branch point 71c of the low-voltage power supply line 71 is located outward of the inverter assembly 8 with respect to the first connector portion 81. The connector terminal 61a of the first wire harness 61 and the first connector portion 81 are electrically connected to each other by connection of pins having a male/female relationship. Since the low-voltage power supply line 71 passes through the first connector portion 81 in a state of being branched into the controller power supply line 71a and the pump power supply line 71b, the controller power supply line 71a and the pump power supply line 71b pass through pins different from each other. Therefore, the value of the current flowing through one pin can be suppressed, and the heat generation of the pin can be suppressed. The branch point 71c may be located inside the inverter assembly 8. In this case, in order to suppress heat generation of the pin, it is preferable to use a large-current pin having a large cross-sectional area as the pin through which the low-voltage power supply line 71 passes.

The controller power supply line 71a supplies drive power to the controller 8c. The controller power supply line 71a reaches the inside of the inverter assembly 8 from the branch point 71c via the first connector portion 81 and is connected to the controller 8c.

The pump power supply line 71b supplies drive power to the electric pump 97. The pump power supply line 71b reaches the inside of the inverter assembly 8 from the branch point 71c via the first connector portion 81, and is connected to the electric pump 97 from the second connector portion 82 via the second wire harness 62.

The second wire harness 62 electrically connects the electric pump 97 and the inverter assembly 8. One end of the second wire harness 62 is bundled by a first connector terminal 62a, and the other end is bundled by the second connector terminal 62b. The first connector terminal 62a bundles not only the second wire harness 62 but also the end of a third wire harness 63. That is, the end of the second wire harness 62 and the end of the third wire harness 63 are bundled together by the first connector terminal 62a. The first connector terminal 62a is connected to the second connector portion 82 of the inverter assembly 8. The second connector terminal 62b is connected to the pump connector portion 97a.

The second wire harness 62 includes the pump power supply line 71b and a pump signal line 72. The pump signal line 72 transmits a signal between the controller 8c and the electric pump 97. The pump signal line 72 transmits, to the electric pump 97, a signal issued by the controller 8c and instructing driving of the electric pump 97. In addition, the pump signal line 72 transmits the driving state of the electric pump 97 from the electric pump 97 to the controller 8c.

According to the present example embodiment, the second wire harness 62 includes the pump power supply line 71b for driving the electric pump 97 and the pump signal line 72 for transmitting a signal of the electric pump 97. Therefore, the path of the wire harness can be simplified and the assembly process can be simplified as compared with the case where the power supply line and the signal line are routed to the electric pump 97 from the external power supply (not illustrated) and the inverter assembly 8, respectively.

The third wire harness 63 will be described with reference to FIGS. 1 and 2. The third wire harness 63 electrically connects the motor 30 and the inverter assembly 8. One end of the third wire harness 63 together with the end of the second wire harness 62 is bundled by the first connector terminal 62a. The other end of the third wire harness 63 is bundled by the third connector terminal 63b. The third connector terminal 63b is connected to the motor connector portion 4.

The third wire harness 63 is connected to the fourth wire harness 64 having a temperature sensor signal line (sensor signal line) 73 and a rotation sensor signal line (sensor signal line) 74 via the motor connector portion 4. That is, the third wire harness 63 is a signal line.

The fourth wire harness 64 includes a fourth connector terminal 64a, the temperature sensor signal line 73, and the rotation sensor signal line 74. The fourth wire harness 64 is a bifurcated wire harness in which the temperature sensor signal line 73 and the rotation sensor signal line 74 are connected to one fourth connector terminal 64a. The temperature sensor signal line 73 transmits a signal between the controller 8c and the temperature sensor 38. The signal transmitted through the temperature sensor signal line 73 includes information on the temperature of the motor 30 measured by the temperature sensor 38. Similarly, the rotation sensor signal line 74 transmits a signal between the controller 8c and the rotation sensor 39. The signal transmitted by the rotation sensor signal line 74 includes information on the rotation angle of the motor 30 measured by the rotation sensor 39. In the present example embodiment, the temperature sensor signal line 73 includes two cables and one connector, but may include one cable. In the present example embodiment, the rotation sensor signal line 74 includes two cables and one connector, but may include one cable.

Figure 3:
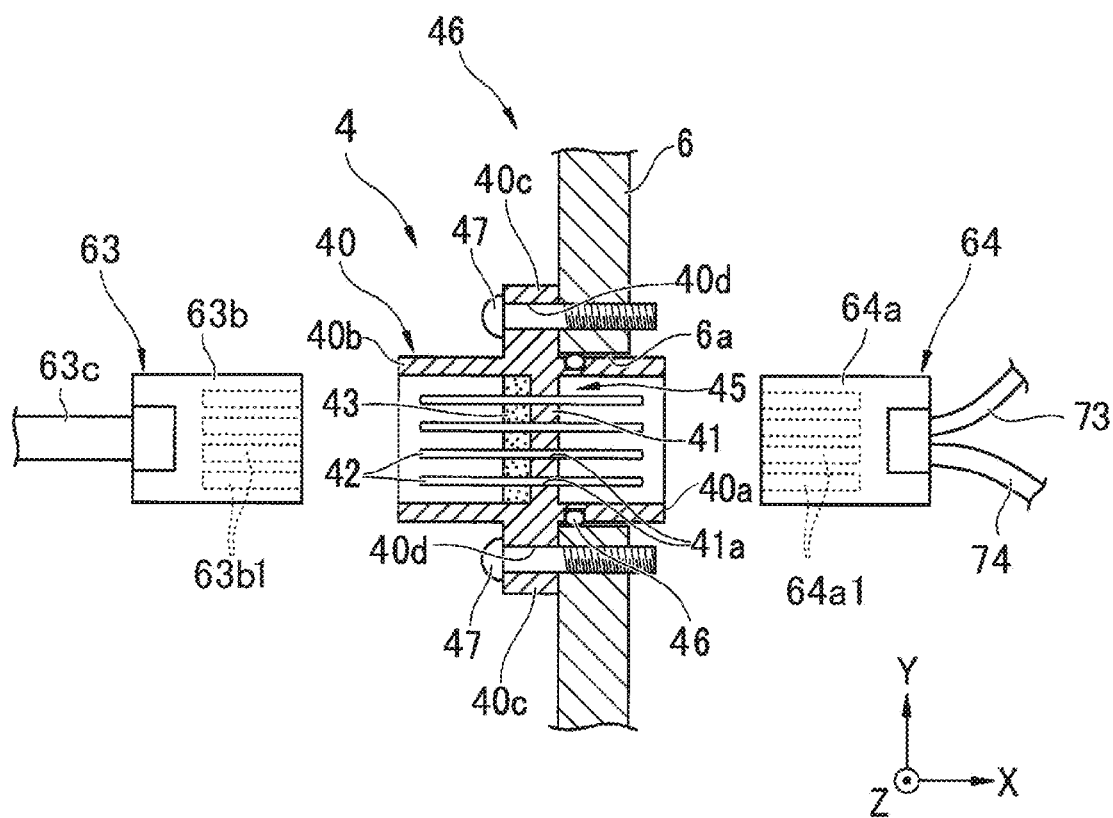
FIG. 3 is a cross-sectional view of a motor connector portion according to an example embodiment of the present disclosure.

Next, the motor connector portion 4 will be described with reference to FIGS. 2 and 3. The motor connector portion 4 is a connector that connects the fourth wire harness 64 connected to the temperature sensor 38 and the rotation sensor 39 and the third wire harness 63 located outside the housing 6. As illustrated in FIG. 3, the motor connector portion 4 includes a connector main body 40, a partition wall 41, a plurality of conductive terminals 42, and a sealing resin 43. Although four conductive terminals 42 are illustrated in FIG. 3, the number of the conductive terminals 42 can be appropriately changed.

The connector main body 40 is a cylindrical member extending in one direction. The connector main body 40 includes a tubular inner connection portion 40a that opens to one side of the connector main body 40, a tubular outer connection portion 40b that opens to the other side of the connector main body 40, and two flange portions 40c that protrude outward from the outer peripheral face of the connector main body 40. Each of the two flange portions 40c has a through hole 40d penetrating the flange portion 40c in the thickness direction. The connector main body 40 includes a seal 46 disposed in the groove portion of the outer peripheral face of the inner connection portion 40a. The seal 46 is, for example, an O-ring.

The partition wall 41 is located inside the connector main body 40. The partition wall 41 is a partition wall that partitions the inner connection portion 40a and the outer connection portion 40b inside the connector main body 40. In the present example embodiment, the partition wall 41 and the connector main body 40 are part of a single resin molded member.

The partition wall 41 holds the plurality of conductive terminals 42. The partition wall 41 has a plurality of terminal insertion holes 41a penetrating the partition wall 41 in the thickness direction. In the present example embodiment, the conductive terminal 42 is a metal pin extending along the direction in which the connector main body 40 extends. The conductive terminal 42 is inserted into the terminal insertion hole 41a. The conductive terminal 42 may be insert-molded in the partition wall 41 and the connector main body 40. The one end of the conductive terminal 42 is located inside the inner connection portion 40a. The other end of the conductive terminal 42 is located inside the outer connection portion 40b.

The sealing resin 43 is located on the face, of the partition wall 41, toward the outer connection portion 40b. The innermost portion of the outer connection portion 40b is filled with the sealing resin 43. The sealing resin 43 is made of a urethane resin, an epoxy resin, an acrylic resin, or the like. The sealing resin 43 is in close contact with the outer peripheral face of the conductive terminal 42 and the inner peripheral face of the outer connection portion 40b, and liquid-tightly seals the close contact surface. In the present example embodiment, the partition wall 41 and the sealing resin 43 constitute a sealing wall 45 that liquid-tightly seals the space between the inner connection portion 40a and the outer connection portion 40b.

According to the motor assembly 10 of the present example embodiment, since the motor connector portion 4 has the configuration of liquid-tightly sealing the space between the inner connection portion 40a and the outer connection portion 40b, it is possible to prevent the refrigerant inside the motor 30 from leaking outside of the housing 6 from the motor connector portion 4. In the present example embodiment, even when the refrigerant such as oil O injected into the motor 30 to cool the stator 32 passes through the inside of the fourth wire harness 64 and enters the inner connection portion 40a, leakage of the refrigerant to the outer connection portion 40b does not occur since the inside of the motor connector portion 4 is liquid-tightly sealed.

Since both the inner connection portion 40a and the outer connection portion 40b are terminals to which the connector of the wire harness is connected, the cable can be freely routed inside and outside the housing 6. As a result, the motor assembly 10 can be easily assembled, and the manufacturing efficiency is improved.

In the present example embodiment, since both the inner connection portion 40a and the outer connection portion 40b are male terminals, the conductive terminal 42 is a simple rod-shaped metal pin. Therefore, the boundary portion between the partition wall 41 and the conductive terminal 42 can be easily sealed with the sealing resin 43. Note that one or both of the inner connection portion 40a and the outer connection portion 40b may be used as female terminals when sufficient sealability is obtained by the partition wall 41 and the sealing resin 43.

In the present example embodiment, the motor connector portion 4 is sealed by the combination of the partition wall 41 and the sealing resin 43, but the present disclosure is not limited to this configuration. For example, when the inner connection portion 40a and the outer connection portion 40b can be sealed in a liquid-tight manner only by insert-molding the conductive terminal 42 in the connector main body 40, the motor connector portion 4 without the sealing resin 43 may be used. In this case, the partition wall 41 is a sealing wall having a liquid sealing property.

Further, the sealing resin 43 is disposed so as to cover the face toward the outer connection portion 40b, but the sealing resin 43 may be disposed only at the proximal end, of the conductive terminal 42, toward the partition wall 41. In this case, the sealing resin 43 is in close contact with the outer peripheral face of the conductive terminal 42 and the face, of the partition wall 41, toward the outer connection portion 40b, and liquid-tightly seals the close contact surface.

Part of the sealing resin 43 may be located inside the terminal insertion hole 41a. That is, the gap between the outer peripheral face of the conductive terminal 42 and the inner face of the terminal insertion hole 41a may be liquid-tightly sealed by the sealing resin 43.

The motor connector portion 4 is inserted into the connector insertion hole 6a of the housing 6 from the inner connection portion 40a side. The seal 46 seals the space between the outer peripheral face of the connector main body 40 and the inner peripheral face of the connector insertion hole 6a. The connector main body 40 is fastened to the outer face of the housing 6 by a bolt 47 inserted into the through hole 40d of the flange portion 40c. As a result, the motor connector portion 4 is disposed so that the inside and the outside of the housing 6 can be electrically connected.

Inside the housing 6, a fourth connector terminal of the fourth wire harness 64 is connected to the inner connection portion 40a of the motor connector portion 4. The temperature sensor signal line 73 and the rotation sensor signal line 74 are connected to the fourth connector terminal. That is, in the case of the present example embodiment, as illustrated in FIG. 2, the inner connection portion 40a is connected to the rotation sensor 39 via the rotation sensor signal line 74 of the fourth wire harness 64 and to the temperature sensor 38 via the temperature sensor signal line 73 of the fourth wire harness 64.

As illustrated in FIG. 3, the fourth connector terminal 64a of the fourth wire harness 64 is a female connector having a plurality of conductive terminals 64a1. A plurality of conductive wires included in the temperature sensor signal line 73 and the rotation sensor signal line 74 is connected to the conductive terminals 64a1. The fourth connector terminal 64a is inserted into the inner connection portion 40a. The conductive terminal 64a1 of the fourth connector terminal 64a is connected to the conductive terminal 42 of the motor connector portion 4.

That is, as illustrated in FIGS. 2 and 3, the motor connector portion 4 is connected to the temperature sensor 38 and the rotation sensor 39. The fourth connector terminal 64a of the fourth wire harness 64 is connected to the temperature sensor 38 and the rotation sensor 39.

Outside the housing 6, the outer connection portion 40b of the motor connector portion 4 is connected to the third wire harness 63.

As illustrated in FIG. 3, the third connector terminal 63b of the third wire harness 63 is a female connector having a plurality of conductive terminals 63b1. A plurality of conductive wires included in a cable 63c is connected to the conductive terminals 63b1. The third connector terminal 63b is inserted into the outer connection portion 40b. The conductive terminal 63b1 of the third connector terminal 63b is connected to the conductive terminal 42 of the motor connector portion 4.

The first connector terminal 62a at the end of the third wire harness 63 is connected to the inverter assembly 8. With the above connection structure, the output signal from the temperature sensor 38 and the output signal from the rotation sensor 39 are transmitted to the controller 8c through the fourth wire harness 64, the motor connector portion 4, and the third wire harness 63.

Thus, according to an aspect of the present disclosure, there is provided a drive device including a connector that can be sealed even when a refrigerant enters a wire harness.

According to the present example embodiment, the pump power supply line 71b, the pump signal line 72, and the sensor signal lines 73 and 74 are connected to the inverter assembly 8 at one second connector portion 82. Therefore, the number of connector portions can be reduced as compared with the case where the inverter assembly 8 has the connector portion for each line. Therefore, the assembly process of the motor assembly 10 can be simplified.

Figure 4:
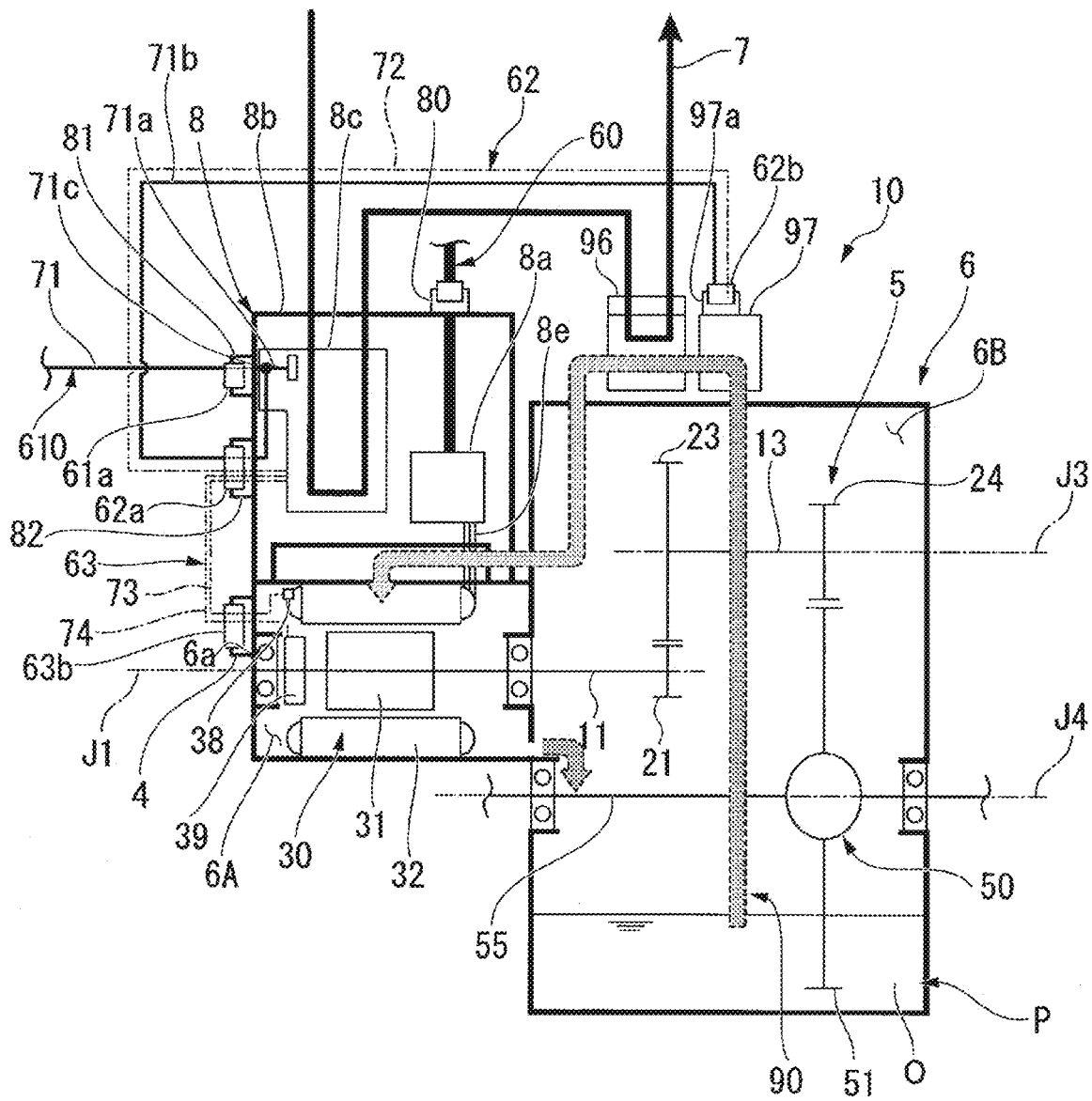
FIG. 4 is a conceptual view of a motor assembly in a modification of an example embodiment of the present disclosure.

FIG. 4 illustrates a modification. Description of the same configuration as that of an aspect of the present disclosure will be omitted. A first wire harness 610 includes the low-voltage power supply line 71. The low-voltage power supply line 71 is a line that transmits low-voltage power from an external power supply to the controller 8c and the electric pump 97. The low-voltage power supply line 71 is branched into a controller power supply line 71a and a pump power supply line 71b at a branch point 71c.

The branch point 71c of the low-voltage power supply line 71 is located inward of the inverter assembly 8 with respect to the first connector portion 81. That is, the line is branched into the controller power supply line 71a and the pump power supply line 71b at the controller 8c of the inverter assembly 8. According to this structure, the structure of the first wire harness 610 can be simplified.

While example embodiments of the present disclosure and modifications thereof have been described above, it will be understood that features, a combination of the features, and so on according to each of the example embodiments and the modifications thereof are only illustrative and not restrictive, and that an addition, elimination, and substitution of a feature(s), and other modifications can be made without departing from the scope and spirit of the present disclosure. Also note that the present disclosure is not limited by the example embodiment.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor assembly comprising:
   a motor;
   an electric pump to supply oil to the motor;
   an inverter assembly connected to the motor; and
   a first wire harness and a second wire harness; wherein the inverter assembly includes:
- an inverter to convert a high-voltage direct current into an alternating current and supply the alternating current to the motor; and
- a controller to control the inverter and the electric pump;

the first wire harness electrically connects an external power supply and the inverter assembly, and includes a low-voltage power supply line;

the low-voltage power supply line includes a branch point at which the low-voltage power supply line is branched into a controller power supply line to supply drive power to the controller and a pump power supply line to supply drive power to the electric pump; and the second wire harness electrically connects the electric pump and the inverter assembly, and includes the pump power supply line and a pump signal line to transmit a signal between the controller and the electric pump.

2. The motor assembly according to claim 1, wherein
the inverter assembly includes a first connector portion to which the first wire harness is connected; and
the branch point of the low-voltage power supply line is located outward of the inverter assembly with respect to the first connector portion.

3. The motor assembly according to claim 1, further comprising:
- a sensor to measure a state of the motor; and
- a third wire harness and a fourth wire harness that electrically connect the sensor and the inverter assembly; wherein the third wire harness and the fourth wire harness include a sensor signal line to transmit a signal between the controller and the sensor; and the inverter assembly includes a second connector portion to which the second wire harness and the third wire harness are bundled and connected.

4. The motor assembly according to claim 3, wherein the sensor includes:
- a temperature sensor to measure a temperature of the motor; and
- a rotation sensor to measure a rotation angle of the motor.

5. The motor assembly according to claim 1, wherein
the inverter assembly includes a high-voltage connector portion to which a high-voltage wire harness extending from an external battery is connected; and
power is supplied to the inverter from the battery via the high-voltage connector portion and the high-voltage wire harness.

6. The motor assembly according to claim 3, further comprising:
- a housing that accommodates the motor and the sensor; wherein the housing includes a motor connector portion that electrically connects the sensor and the inverter assembly; and the motor connector portion includes:
- a connector main body including an inner connection portion and an outer connection portion positioned inside and outside the housing, respectively;
- conductive terminals fixed inside the connector main body; and
- a sealing wall holding the conductive terminals and liquid-tightly sealing a space between the inner connection portion and the outer connection portion.

7. The motor assembly according to claim 6, wherein the sealing wall includes:
- a partition wall that partitions the inner connection portion and the outer connection portion inside the connector main body; and
- a sealing resin that seals proximal ends of the conductive terminals exposed from the partition wall.

8. The motor assembly according to claim 7, wherein
the housing includes a connector insertion hole into which the motor connector portion is inserted; and
the housing includes a seal that seals the connector insertion hole between the motor connector portion and the housing.

9. The motor assembly according to claim 6, wherein the inner connection portion and the outer connection portion are both male terminals.

\* \* \* \* \*